(12) United States Patent
Bando

(10) Patent No.: US 6,449,053 B2
(45) Date of Patent: Sep. 10, 2002

(54) PRINTING SYSTEM, A PRINTING METHOD, A CONVERTING DEVICE, A DATA PROCESSING METHOD AND A PRINTING DEVICE

(75) Inventor: Hiroyuki Bando, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,082

(22) Filed: Jul. 16, 1997

(30) Foreign Application Priority Data

Jul. 23, 1996 (JP) ............................................. 8-193041

(51) Int. Cl.[7] .......................... G06F 13/00; G06F 13/12; G06K 15/02
(52) U.S. Cl. ..................... 358/1.15; 358/1.13; 358/1.14; 358/1.16
(58) Field of Search ................................ 395/114, 115, 395/116, 117, 112, 113, 101; 358/1.15, 1.13, 1.14, 1.16

(56) References Cited

U.S. PATENT DOCUMENTS

| 5,577,172 | A | * | 11/1996 | Vatland et al. | ............... 395/114 |
|---|---|---|---|---|---|
| 5,619,694 | A | * | 4/1997 | Schoenzeit et al. | .......... 395/118 |
| 5,659,795 | A | * | 8/1997 | Duvall et al. | ................ 395/835 |
| 5,675,719 | A | * | 10/1997 | Matias et al. | ................ 395/115 |
| 5,692,111 | A | * | 11/1997 | Marbry et al. | ............... 395/114 |
| 5,699,495 | A | * | 12/1997 | Snipp | .......................... 395/114 |
| 5,706,410 | A | * | 1/1998 | Bagley et al. | ............... 395/112 |
| 5,935,262 | A | * | 8/1999 | Barrett et al. | .................. 714/46 |
| 6,177,934 | B1 | * | 1/2001 | Sugiura et al. | ............. 345/335 |

FOREIGN PATENT DOCUMENTS

| JP | 6-59833 | 3/1994 | ............. G06F/3/12 |
|---|---|---|---|
| JP | 7-13722 | 1/1995 | ............. G06F/3/12 |

* cited by examiner

Primary Examiner—Joseph Mancuso
Assistant Examiner—Douglas Tran
(74) Attorney, Agent, or Firm—Oblon, Spivak, McClelland, Maier & Neustadt, P.C.

(57) ABSTRACT

A computer network is provided with a RIP server connected thereto to convert page description language (PDL) data into raster image data. The network also has connected thereto an output engine which works as a network printer without a RIP means to convert PDL data into raster image data. When printing out through the output engine, the host computer outputs PDL data corresponding to print-out data to the RIP server. The RIP server converts PDL data into raster image data, and transmits it to the output engine through the network to print out. A printing system thus achieves a cost reduction as a whole.

19 Claims, 12 Drawing Sheets

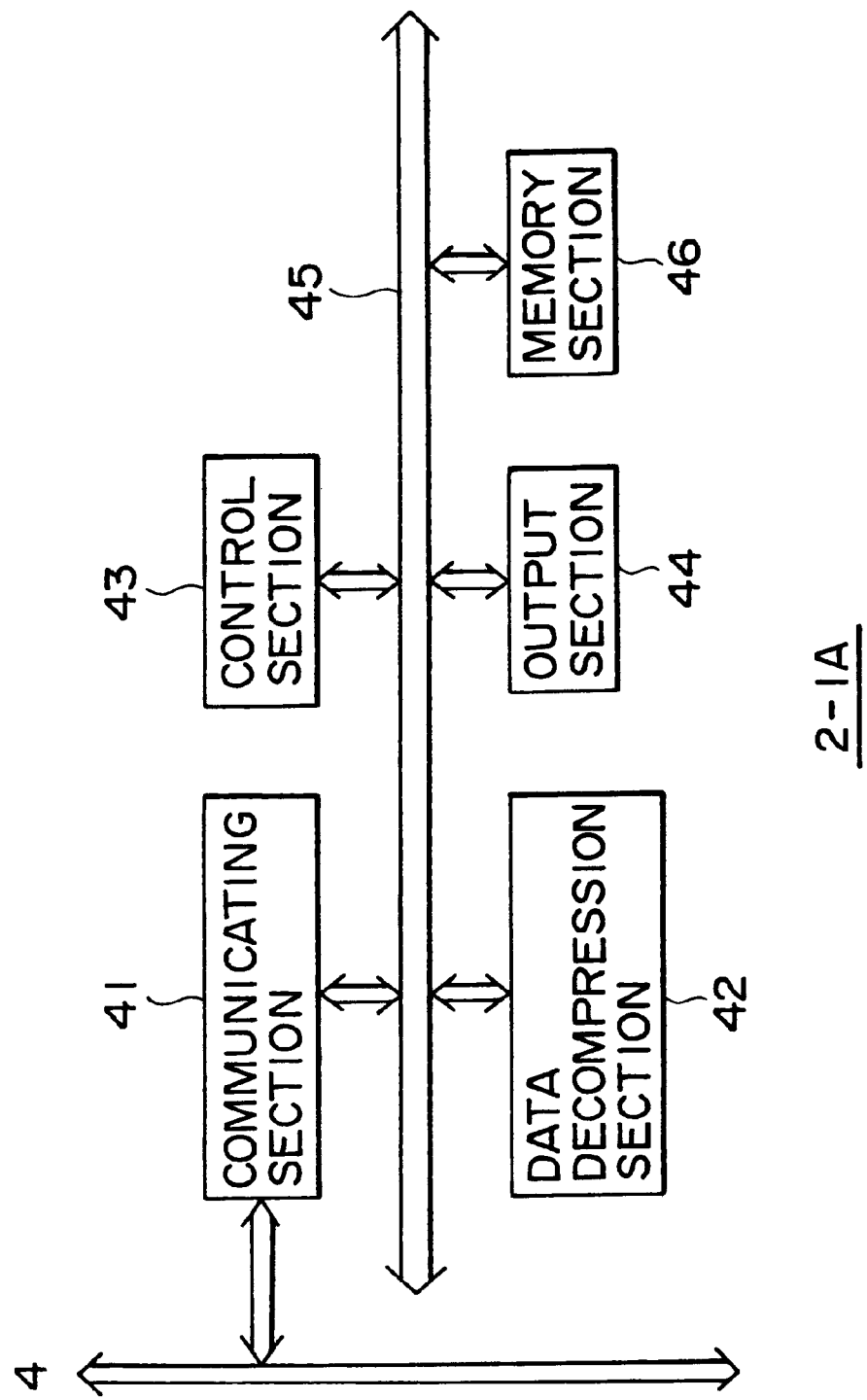

FIG. 7A
BASIC FORMAT

| Dest.Addr. | Source. Addr. | Command | Data |
|---|---|---|---|

FIG. 7B
RIP ENTRY REQUEST

| ff.ff.ff | Client Addr. | RIP Entry Request |
|---|---|---|

BROADCAST

FIG. 7C
REPLY RIP ENTRY

| Client Addr. | RIP Server Addr. | Reply RIP Entry | RIP Entry Data |
|---|---|---|---|

FIG. 7D
CONNECTION REQUEST

| RIP Server Addr. | Client Addr. | Connection Request | Socket No. |
|---|---|---|---|

FIG. 7E
PDL DATA SEND

| RIP Server Addr. | Client Addr. | PDL Data Send | PDL Data |
|---|---|---|---|

FIG. 7F
CONTROL PRINTER

| Printer Addr. | RIP Server Addr. | Printer Control Command | Control Data |
|---|---|---|---|

FIG. 7G
RASTER DATA SEND

| Printer Addr. | RIP Server Addr. | Raster Data Send | Raster Image Data |
|---|---|---|---|

FIG. 9

| NO. | ENTRY NAME | SOCKET NO. | NETWORK ADDR. OF OUTPUT DEVICE | CHARACTERISTIC |
|---|---|---|---|---|
| 1 | 'MR. A'S PRINTER' | 1 | 43.10.135.10 | 200 dpi |
| 2 | 'MR. B'S PRINTER' | 2 | 43.12.131.1 | 150 dpi |
| 3 | 'MR. C'S PRINTER' | 3 | 43.122.1.15 | 300 dpi |
| ... | ... | ... | ... | ... |

PRINTING SYSTEM, A PRINTING METHOD, A CONVERTING DEVICE, A DATA PROCESSING METHOD AND A PRINTING DEVICE

BACKGROUND OF THE INVENTION

The present invention relates to a printing system, a printing method, a converting device, a data processing method and a printing device, more particularly to a printing method, a converting device, a data processing method and a printing device, which are capable of achieving a cost reduction as the entire system.

As a computer network (hereinafter referred to as a "network") represented by the Internet has become spread in use, it has come to be proposed recently to connect various electronic devices and computer terminals to a network and utilize the electronic devices from the computer terminals. For example, there has been proposed a printing system in Japanese Laid-Open Patent Application 06-59833 published in March 1994, wherein a plurality of printers are connected to a network in such a manner that when a specific printer having received data from the host computer to print out is unable to execute its printing out for one reason or another, the printer transfers the received data to another printer where to print out the data.

In Japanese Laid-Open Patent Application 07-13722 published in January 1995, there has been proposed a printing system, wherein a plurality of printers are connected to a network in such a manner that when a specific printer having received data transmitted thereto through the network from the host computer to print out is not free, the printer transfers the transferred data through the network to another printer free for use for converting the data into raster image data (bitmap image data), and the raster image data thus converted is transferred through the network to the printer intended to print out raster image data when it becomes available to execute its printing out.

FIG. 1 is a schematic diagram showing a related art system of the above-described type. As shown in FIG. 1, a network 64 is composed of host computers 61-1 and 61-2 and a plurality of network printers 62-1, 62-2 and 62-3 connected thereto.

The network printer 62-1 (62-2 or 62-3) is composed of a raster image processor (RIP) 62-1A and an output engine 62-1B. The raster image processor 62-1A interprets page description language (PDL) data transmitted thereto through the network 64 from the host computer 61-1 (or the host computer 61-2) and converts the language into raster image data, and the output engine 62-1B prints out the raster image data produced by the RIP 62-1A on paper or the like. The RIP 62-1A and the output engine 62-1B are integrated into the network printer 62-1. Alternatively, for the network printer 62-3, the RIP 62-3A is connected to an output engine 62-3B through an exclusive interface 62-3C.

For example, the RIP 62-1A of the network printer 62-1, when it receives data transmitted thereto throughout the network 64 from the host computer 61-1, interprets its PDL data and converts the received data into raster image data. The raster image data is transferred to the output engine 62-1B to print out the data on paper or the like.

A printer used in a related art system is composed of a RIP and output engine as described above. A RIP is particularly expensive and makes all printers connected to the network 64 inevitably expensive. Because this RIP requires fonts, all the printers need to be provided with these fonts, which makes them expensive.

SUMMARY OF THE INVENTION

An object of the present invention is to provide a printing system, a printing method, a converting device, a data processing method, and a printing device, which are capable of achieving a cost reduction as a whole and of selecting a desired printer quickly without fail.

In a printing system and a printing method according to one aspect of the present invention, a command device supplies page description language data representing print-out data and a designation code designating a printing device to carry out printing-out to a converting device through a network. The converting device converts the page description language data transmitted thereto from the command device through the network into a raster image data and outputs the converted raster image data together with a print-out command to the printing device designated by the command device. In response to this command, the printing device prints out the raster image data transmitted thereto from the converting device through the network.

According to the printing system and the printing method having the above configuration, the converting device converts page description language data transmitted thereto from a command device through the network into raster image data which is transferred to the printing device through the network for its printing-out, so that the system can be reduced in cost as a whole. Because a designation code is transferred from the converting device to the command device, the command device is not required to keep the addresses of printing devices under its management, so that a desired printing device can be selected quickly without fail.

In a converting device and a data processing method according to another aspect of the present invention, a converting device, when it receives a print-out command from a command device, notifies a pre-set printing device to the command device through a network. When receiving page description language data representing print-out data from the command device through the network, the converting device converts the received page description language data into raster image data which is transferred through the network to the address of a printing device designated by the command device.

According to the converting device and the data processing method having the above configuration, the addresses of printing devices connected to the network are stored in the command device and the command device designates a desired one among the stored printing devices, so that the command device is not required to keep the network addresses of printing devices under its management, allowing a desired printing device to execute its printing-out quickly without fail.

In a printing device and a printing method according to a further aspect of the present invention, a printing device not having a function to convert page description language data into raster image data receives raster image data transmitted from a converting device through a network and prints-out the raster image data thus received.

According to the printing device and the printing method having the above configuration, the printing device substantially having no function to convert page description language data into raster image data prints out the raster image data transmitted through the network as it is, so that it is possible to simplify the structure of the printing device and reduce the cost thereof.

BRIEF DESCRIPTION OF THE DRAWINGS

FIG. 6 is a block diagram showing functional blocks of an output engine in the embodiment shown in FIG. 2;

FIGS. 7A to 7G are diagrams showing formats of packets transmitted on a network according to the embodiment shown in FIG. 2;

FIG. 9 is a RIP entry table stored in the RIP server shown in FIG. 2;

DESCRIPTION OF THE PREFERRED EMBODIMENTS

Figure 1:
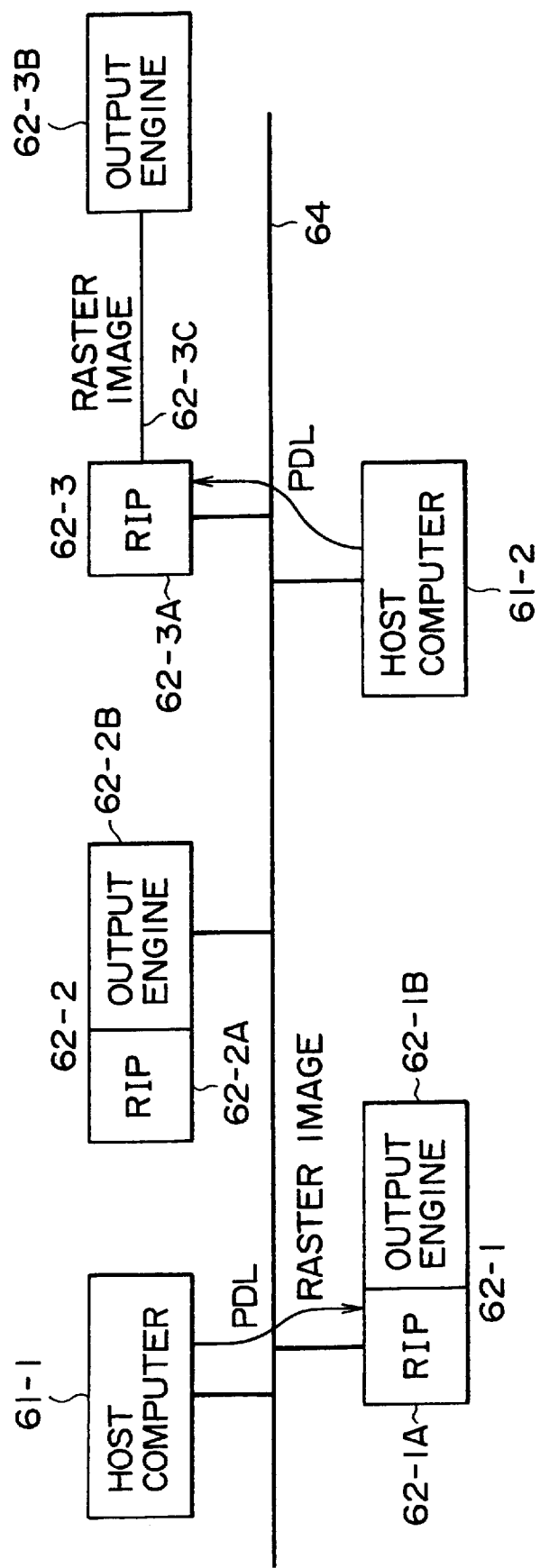
FIG. 1 is a diagram showing a configuration of a related art printing system.
Figure 2:
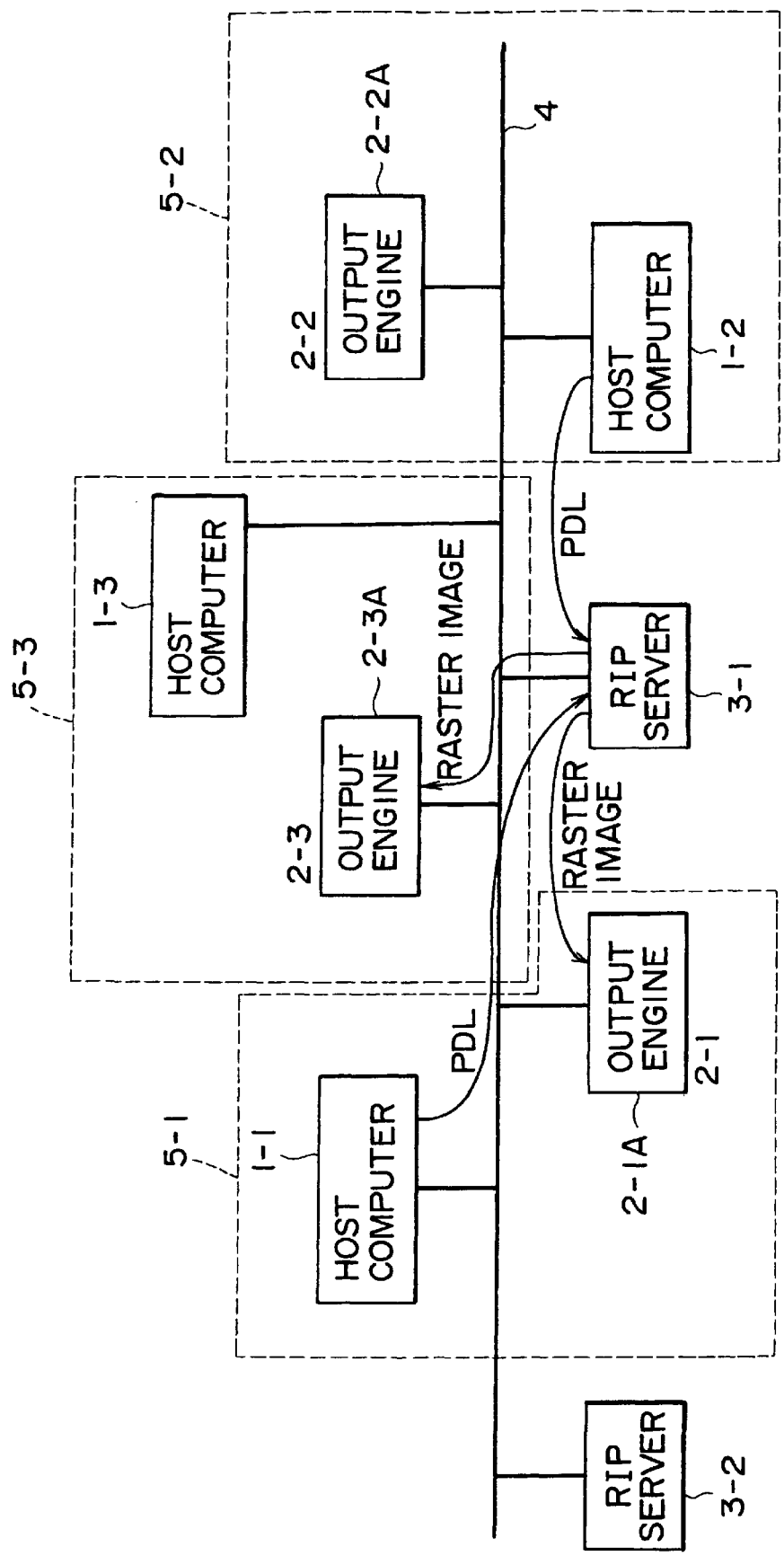
FIG. 2 is a diagram showing a configuration of a printing system according to an embodiment of the present invention.

FIG. 2 shows a configuration of a printing system embodying the present invention. In this embodiment, a host computer (a command device) 1-1 and an output engine 2-1A as a network printer (a printing device) 2-1 are installed in a room 5-1. Both of them are connected to a network 4.

Likewise, a host computer 1-2 and an output engine 2-2A as a network printer 2-2 are installed in a room 5-2. In a room 5-3, there are installed a host computer 1-3 and an output engine 2-3A as a network printer 2-3. These rooms 5-1 to 5-3 may be different rooms in the same building or rooms located remotely from each other. If the network 4 is an international network like the Internet, for example, the rooms 5-1, 5-2 and 5-3 may be located in Japan, Britain and the United States, respectively.

The network 4 has a plurality (two in this embodiment) of RIP servers (converting devices) 3-1 and 3-2 connected thereto. The RIP servers 3-1 and 3-2 receive PDL data from the host computers 1-1 to 1-3 through the network 4, and convert PDL data into raster image data (bitmap image data) which are output to the desired output engines 2-1A to 2-3A.

The users of the output engines 2-1A to 2-3A, when they connect the output engines 2-1A to 2-3A to the network 4, access the RIP server 3-1 or 3-2 and allocate addresses of the output engines 2-1A to 2-3A on the network 4. Thus, each RIP server stores only the addresses of those required to manage, out of the output engines connected to the network 4.

Figure 3:
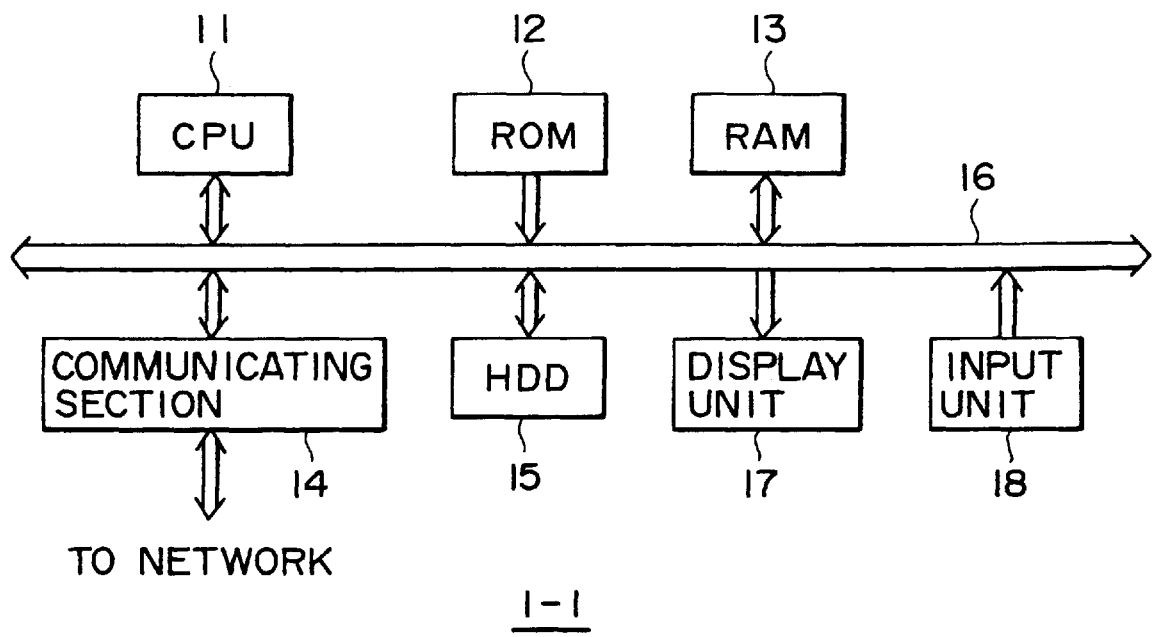
FIG. 3 is a block diagram showing a configuration of a host computer according to the embodiment shown in FIG. 2.

For example, the host computer 1-1 is configured as shown in FIG. 3. CPU 11 executes various types of processing according to programs stored in ROM 12. RAM 13 stores data and programs as required for CPU 11 to execute various types of processing. A communicating section 14 executes communications of data with the network 4. A hard disk (HDD) 15 stores data to transmit or data received or programs to be executed by CPU 11. A display section 17 is composed of LCD, CRT and the like to display data as desired. An input section 18 is composed of a keyboard, a mouse and the like which are operated to input various commands. All these devices are connected to each other through a bus 16.

While not shown, the host computers 1-2 and 1-3 are configured like the host computer 1-1.

Figure 4:
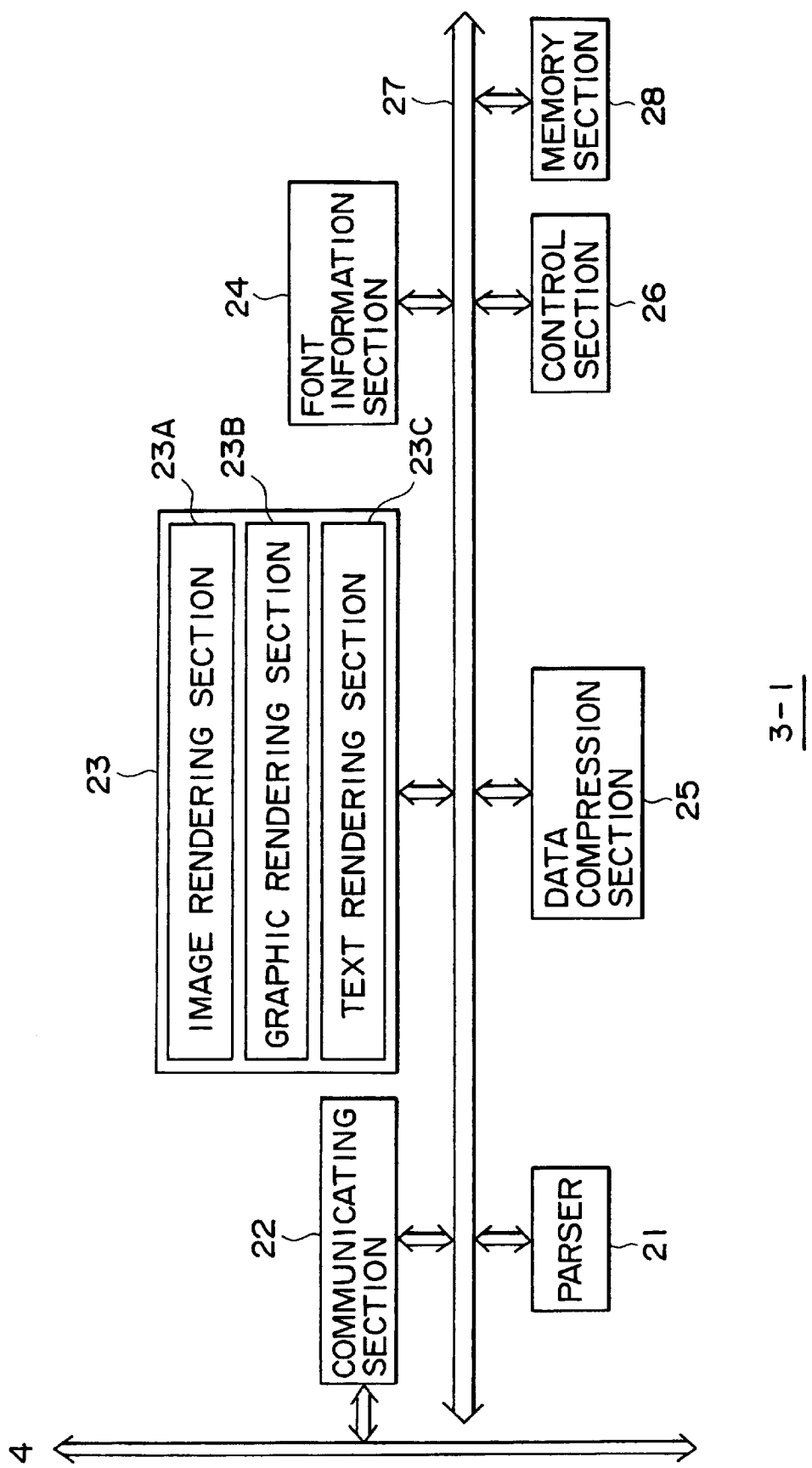
FIG. 4 is a block diagram showing functions of a RIP server shown in FIG. 2.

FIG. 4 shows functional blocks of the RIP server 3-1. As shown in the figure, the RIP server 3-1 has a communicating section 22 to transmit and receive data through the network 4. A parser 21 executes processing to analyze PDL data received through the network 4. A rendering section 23 is composed of an image rendering section 23A, a graphic rendering section 23B and a text rendering section 23C which execute their respective processing to convert into perceivable raster image data (bitmap image data) the original data analyzed by the parser 21 into three objects, i.e., an image, a graphic and a text.

A font information section 24 is utilized when the text rendering section 23C converts text data into perceivable bitmap image data.

A data compressing section 25 executes processing to compress raster image data. The data compression may be performed in accordance with methods specified under the G3 or G4 standard used for facsimiles or under JPEG (Joint Photographic Experts Group) used for compression of static image. For the same purpose, the LZW (Lempel-Ziv and Welch) algorithm may be employed. This LZW algorithm is used to transmit color image data through a desired transmission path or record it on a hard disk. The algorithm is explained in an article "A Technique for High Performance Data Compression" in No. 6, IEEE Computer Vol. 17 dated June 1984.

A control section 26 serves to control operations of the above described sections. A memory section 28 composed of a hard disk, an optomagnetic disk and RAM stores on its RIP entry table the addresses of the output engines 2-1A to 2-3A connected to the network 4. A bus 27 interconnects the above-described devices and sections.

Figure 5:
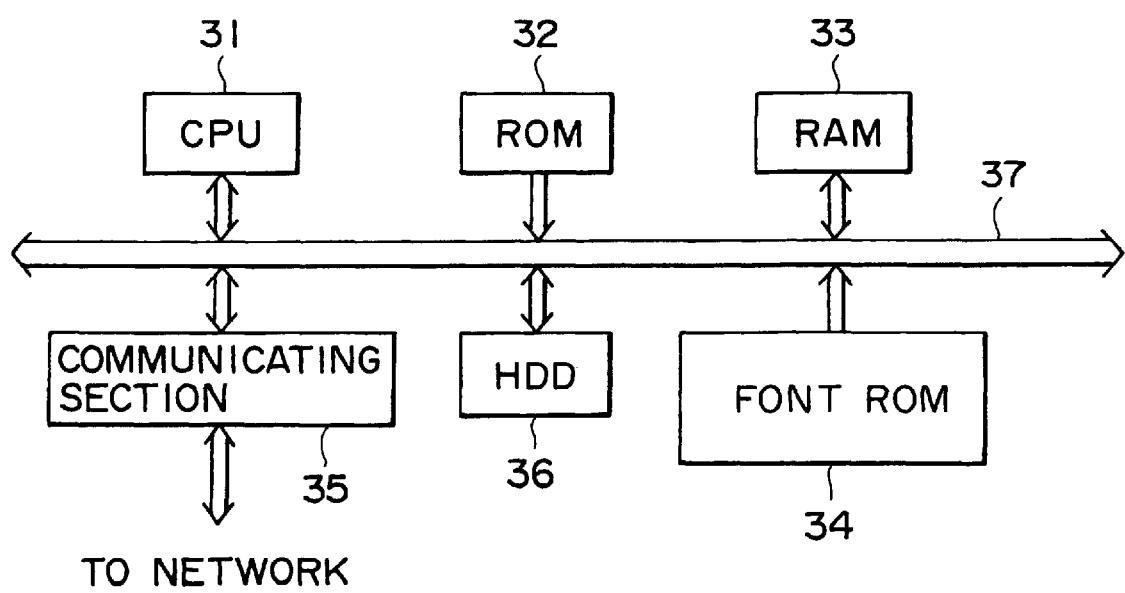
FIG. 5 is a block diagram showing a hardware configuration of the RIP server 3-1 shown in FIG. 2.

The RIP server 3-1 with its functional blocks shown in FIG. 4 can be configured as a hardware device as shown in FIG. 5. In this embodiment, the RIP server 3-1 is composed of ROM 32 to store programs; CPU 31 to execute various types of processing according to programs stored in ROM 32; RAM 33 to store data and programs as required for CPU 31 to execute various types of processing; a font ROM 34 to store font data; a communicating section 35 to execute communications of data with the network 4; and a bus 37 interconnecting the above-described devices and sections. Functions as indicated in the functional blocks of FIG. 4 are executed under a program executed by CPU 31.

While not shown, the RIP server 3-2 is configured like the RIP server 3-1.

FIG. 6 shows a configuration of an output engine 2-1A. In this embodiment, a communicating section 41 transmits and receives data through the network 4 and a data decompression section 42 executes processing to decompress the compressed raster image data. An output section 44 prints out the data on paper or the like in a perceivable form. A control section 43 serves to control the operations of the above-described sections. A memory section 46, including a RAM, stores data or the like as required. A bus 45 interconnects the above-described devices and sections.

FIG. 7 shows formats of packets in case where data is transferred through the network 4. The packet is basically composed of, as shown in FIG. 7A, a destination address indicating the destination of the packet, a source address indicating the source of the packet, a command transmitted from the source of the packet to its destination, and data to be transmitted.

As will be explained fully later, a host computer 1-i (i=1, 2, 3), when it commands a RIP server 3-j (j=1, 2) to print out, outputs a "RIP Entry Request" in a format as shown in FIG. 7B. As a destination address, a code "ff.ff.ff" is given. This does not designate a specific RIP server but designates all the RIP servers. In other words, when a destination address is given with this designation, the host computer addresses to all the RIP servers substantially in a broadcast form. It sends out its address (client address) as a source address and a "RIP Entry Request" as a command.

In response to the "RIP Entry Request", the RIP server 3-j outputs "Reply RIP Entry" to the host computer 1-i in a format as shown in FIG. 7C. It sends out the address of the host computer 1-i (client address) as a destination address, the address of the RIP server 3-j as a source address, "Reply RIP Entry" as a command, and "RIP Entry Data" as data.

When the host computer 1-i receives "Reply RIP Entry" from the RIP server 3-j, it outputs "Connection Request" to the RIP server 3-j in a format as shown in FIG. 7D. It sends out the address of the RIP server 3-j as a destination address and the address of the host computer 1-i as a source address. "Connection Request" is given as a command and "Socket No." as data. "Socket No." stored in the RIP server 3-j is a number (a designation code) to specify a specific network printer 2-k (an output engine 2-kA) according to "RIP Entry Table" to be explained later with reference to FIG. 9.

The format of data where the PDL data is transmitted from the host computer 1-i to the RIP server 3-j is shown in FIG. 7E. It designates the address of the RIP server 3-j as a destination address and the address of the host computer 1-i as a source address. "PDL Data Send" is sent out as a command and "PDL Data" as data.

When the RIP server 3-j commands the output engine 2-kA to print out, it outputs "Control Printer" in a format as shown in FIG. 7F. It designates the address of the network printer 2-k (output engine 2-kA) as destination address and the address of the RIP server 3-j as a source address. "Printer Control Command" is sent out as a command and "Control Data" as data.

The format of data where raster image data is transferred from the RIP server 3-j to the output engine 2-kA is shown in FIG. 7G. It designates the address of the output engine 2-kA as a destination address and the address of the RIP server 3-j as a source address. "Raster Data Send" is sent out as a command and "Raster Image Data" as data.

Figure 8:
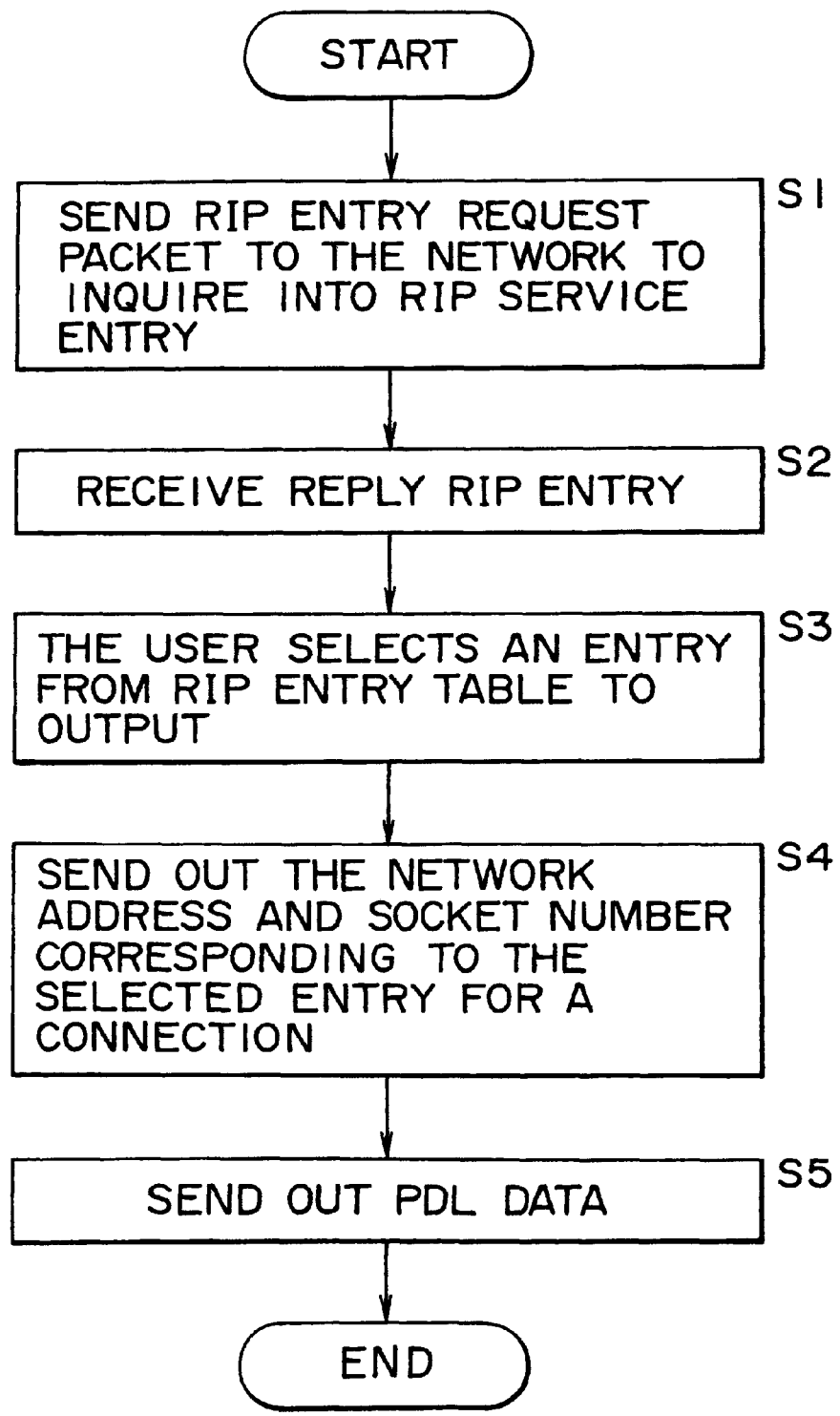
FIG. 8 is a flowchart illustrating processing in the host computer in the embodiment shown in FIG. 2.

Processing by the host computer now will be explained with reference to a flowchart in FIG. 8. The explanation here will be made, for example, where the host computer 1-1 prints out using the output engine 2-1A as the network printer 2-1 installed in the same room 5-1.

In Step S1, CPU 11 of the host computer 1-1 outputs "RIP Entry Request" in a packet formatted as shown in FIG. 7B to the network 4. Included as its command, "RIP Entry Request" requests the RIP server 3-j connected to the network for a service entry (transmission of the RIP entry table stored in memory). Used as a source address in this case is the address of the host computer 1-1. The destination address of the data is an address not specifying any specific electronic device but an address designating all the RIP servers 3-j as its destination (ff.ff.ff). Therefore, this "RIP Entry Request" is broadcast to all the RIP servers 3-j. For its convenience, the explanation here assumes that the network 4 is LAN with a single RIP server connected thereto.

The RIP server 3-j which receives this "RIP Entry Request" through the network 4 sends out "Reply RIP Entry" in response. In Step S2, the host computer 1-1 receives this "Reply RIP Entry" through its communicating section 14. As its data, the received "Reply RIP Entry" contains "RIP Entry Data" as shown in FIG. 7C.

The "RIP Entry Data" contains "RIP Entry Table" as shown in FIG. 9. As shown in the figure, the table contains the entry names, socket numbers, network addresses and characteristics of the network printers 2-k connected to the network in the form of a reference table. CPU 11 of the host computer 1-1 outputs this table to the display section 17 for its display.

The user of the host computer 1-1, looking at this table, picks up and designates a network printer to print out. In this case with printing-out desired on the network printer 2-1 (output engine 2-1A), the user selects Printer No. 1 (Mr. A's printer). This selection is executed with the input section operated in Step S3.

In Step S4, CPU 11 reads out from the RIP entry table the socket number of the printer selected in Step S3 and sends its data as "Connection Request" in a format as shown in FIG. 7D to the RIP server 3-j which has transmitted "Reply RIP Entry." Specifically, in this case, as a destination address in the packet format as shown in FIG. 7D, is designated the address of the RIP server (the RIP server 3-1, for example) which sent out "Reply RIP Entry" the host computer 1-1 has received. As a source address, the address of the host computer 1-1 is used.

In Step S5, the host computer 1-1 outputs PDL data representing print-out data to the RIP server 3-1 in a packet format as shown in FIG. 7E. Specifically, CPU 11 reads out PDL data stored, for example, on a hard disk 15 and sends it out together with the "PDL Data Send" command. In this case, the RIP server 3-1 is designated as a destination address and the host computer 1-1 as a source address.

When the PDL data is sent out to the RIP server 3-1 as explained above, the PDL data is converted into raster image data at the RIP server 3-1 and this raster image data is then sent out to the printer designated in Step S3.

Figure 10:
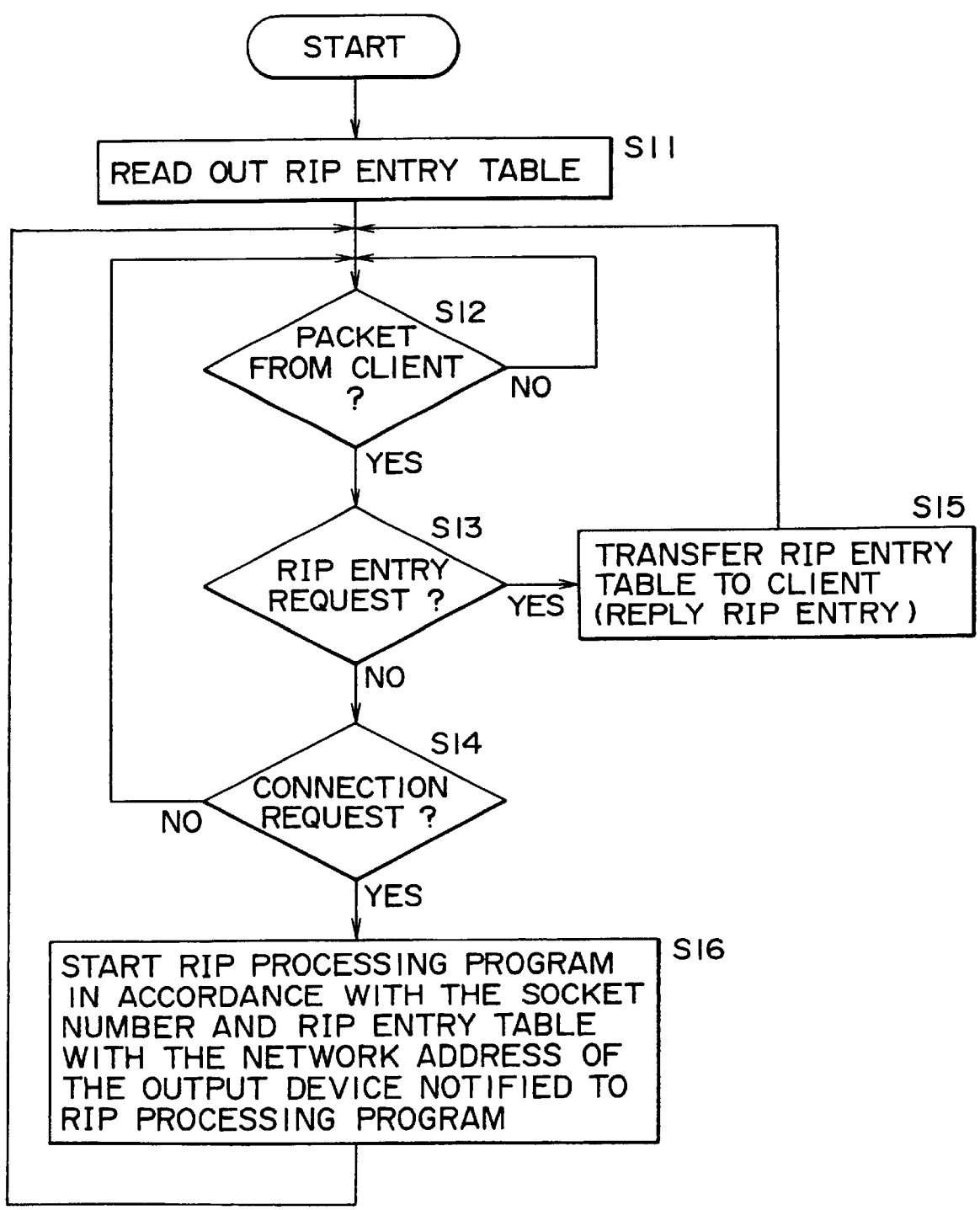
FIG. 10 is a flowchart showing processing of a program "RIP Service Daemon" in the RIP server shown in FIG. 4.
Figure 11:
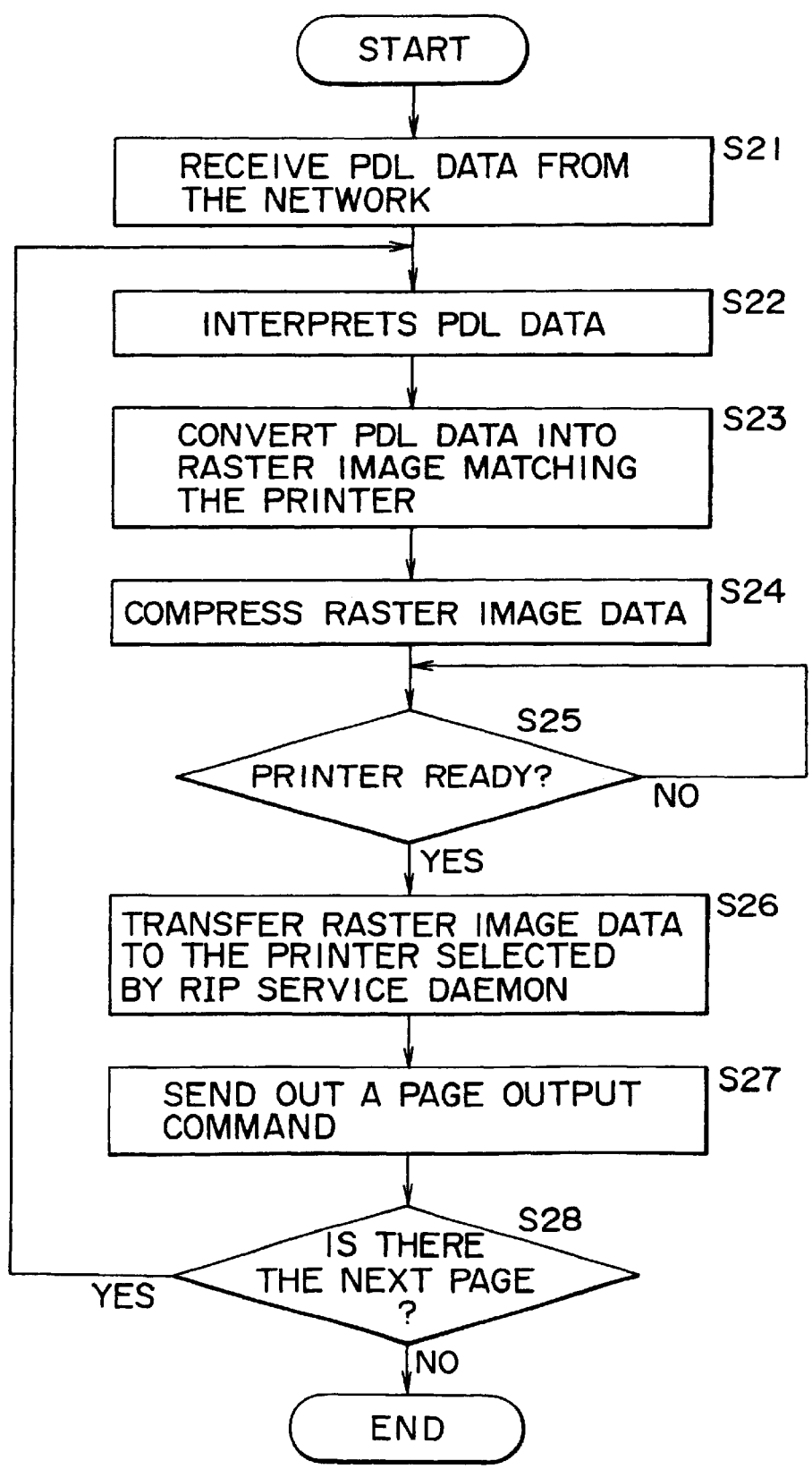
FIG. 11 is a flowchart showing processing of a program "RIP Process" in the RIP server shown in FIG. 4.

Operations of the RIP server 3-1 now will be explained with reference to FIGS. 10 and 11. The RIP server 3-1 has stored therein two programs, i.e., "RIP Service Daemon" and "RIP Processing". FIG. 10 and FIG. 11 show the former program and the latter program, respectively.

In Step S11, the control section 26 (RIP Service Daemon) of the RIP server 3-1 writes in the RIP entry table stored in the memory section 28 as shown in FIG. 9. As shown in FIG. 9, this table stores data containing the network addresses of the network printers 2-k connected to the network. In Step S12, it waits for a packet to be transmitted thereto from the client (the host computer 1-i) through the network and receives via the communicating section 22 a packet transmitted thereto through the network.

In Steps S13 and S14, the control section 26 judges whether the received packet is either "RIP Entry Request" or "Connection Request." When the received packet is judged to be "RIP Entry Request" transmitted from the host computer 1-i in Step S1 in the format as shown in FIG. 7B (this can be judged from "RIP Entry Request" as a command as shown in FIG. 7B), processing advances to Step S15 where the control section 26 transmits to the host computer 1-i specified by the source address of the received packet through the network 4 "Reply RIP Entry" in the packet format as shown in FIG. 7C. "RIP Entry Data" as the packet data contains the RIP entry table as shown in FIG. 9.

The host computer 1-1 receives this "Reply RIP Entry" in Step S2 explained above with reference to FIG. 8. After selecting a network printer to print out from the RIP entry table, it transmits "Connection Request" in Step S4 in the packet format as shown in FIG. 7D.

When it is judged from a "Connection Request" command in the received packet in Step S14 that "Connection Request" has been received, processing advances to Step S16 where the RIP service daemon starts the RIP processing program, the other of the two stored programs (as shown in a flowchart in FIG. 11). At this time, the network address of a printer corresponding to a socket number designated as the packet data in FIG. 7D is read out from the RIP entry table having read out in Step S11, and is notified to the RIP processing program.

Back to Step S12 then, the RIP service daemon executes similar processing in repetition.

The RIP processing program started as explained above executes the reception of the PDL data transmitted thereto through the network 4 in Step S21 in FIG. 11. This PDL data is the one transmitted from the host computer 1-1 in Steps S5 in FIG. 8 in the packet format as shown in FIG. 7E.

Next in Step S22, the parser 21 of the RIP server 3-1 interprets the PDL data received in Step S21 and separates it into image, graphic and text objects to output to the rendering section 23.

In Step S23, the rendering section 23 executes processing to convert the received data into raster image data matching the characteristics of a printer designated by the socket number given in data received in the packet format as shown in FIG. 7D. In this case where the printer on Socket No. 1 is assumed to have a resolution of 200 dpi, raster image data is produced to match that resolution. When a printer on Socket No. 2 or Socket No. 3 is designated, raster image data is produced to match a resolution of 150 dpi or 300 dpi.

In the rendering section 23, image data, graphic data and text data are respectively rendered in the image rendering section 23A, the graphic rendering section 23B and the text rendering section 23C. The text rendering section 23C reads out from the font information section 24C font information necessary for its rendering.

Then in Step S24, raster image data produced in Step S23 is processed for its compression as required. In other words, the data compression section 25 executes processing to compress image data produced in the rendering section 23.

As the received data is converted into raster image data matching the characteristics of a printer which actually prints out, the transmission of an unnecessarily large amount of data (for instance, an unnessarily large amount of data which a printer cannot print out, such as the transmission of 600 dpi data to a 300 dpi printer) to the network 4 can be prevented. In case where a printer is remotely located, the transmission of redundantly large data which causes traffic congestion on the network and slows down communications of data is particularly not preferable.).

In Step S25, the control section 26 judges whether or not the printer designated by the host computer is ready. If the printer is ready, processing advances to Step S26 where the control section 26 executes processing to transfer raster image data to the printer. In other words, the raster image data compressed at the data compression 25 (or uncompressed raster image data) is transferred via the communicating section 22 to the network 4 in a packet format as shown in FIG. 7G. In this case, the output engine 2-1A is designated as a destination address and the RIP server 3-1 as a source address. "Raster Data Send" is transferred as a command and the raster image data as data.

Likewise in Step S27, a page output command is sent out to the printer in a packet format as shown in FIG. 7F. In this case, the output engine 2-1A is designated as a destination address and the RIP server 3-1 as a source address. "Printer Control Command" is transferred as a command and "Control Data" as data.

As will be explained later, the output engine 2-1A prints out raster image data in response to this command.

In Step S28, it is judged whether or not there are other pages to be printed out and, if there are, processing returns to Step S22 from which the above-explained steps are repeated. If there are no other pages, processing terminates.

Figure 12:
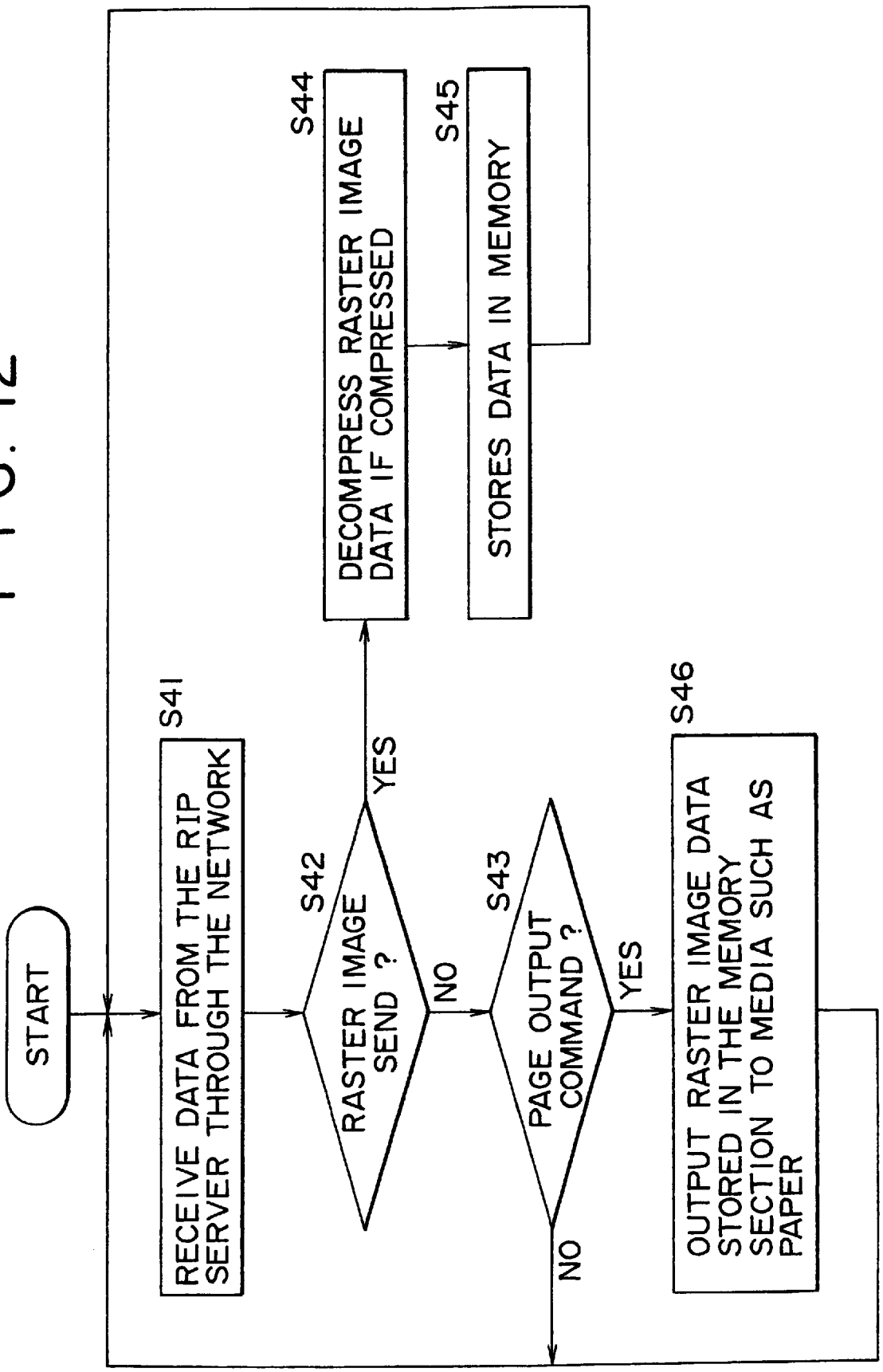
FIG. 12 is a flowchart showing processing of the output engine in FIG. 6.

Next, there will be explained processing at the output engine 2-1A along with a flowchart in FIG. 12. In Step S41, data transferred from the RIP server 3-1 through the network is received at the communicating section 41 of the output engine 2-1A. In Step S42 or Step S43, the control section 43 judges the data received in Steps S41 with reference to a command included in the packet. When the command in the received packet is judged to be "Raster Image Send" in Step S42, processing advances to Step S44 where the raster image data is decompressed if it is compressed. In other words, the data decompression section 42 executes processing to decompress the raster image data compressed at the data compression section 25 of the RIP server 3-1. The decompressed data is stored in the memory section 46 in Step S45.

When the received packet is judged to be the one in a packet format as shown in FIG. 7F in Step S43, the control section 43, in response to its command, supplies the raster image data stored in the memory section to the output section 44 to print out on such media as paper.

Figure 13:
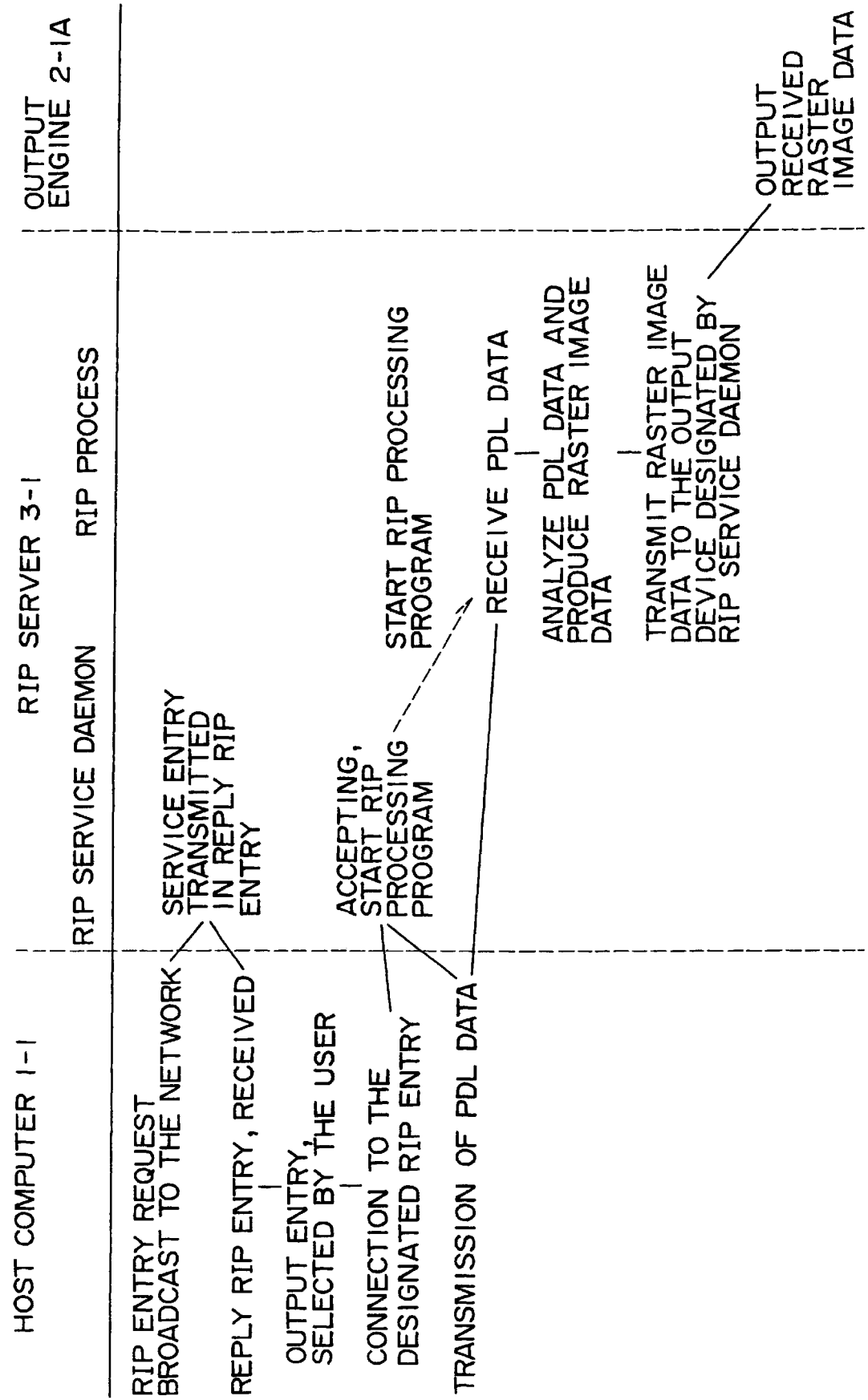
FIG. 13 is a timing chart illustrating processing of the system shown in FIG. 2.

The above-described steps of processing at the host computer 1-1, the RIP server 3-1 and the output engine 2-1A can be summed up as shown in FIG. 13. The host computer 1-1 broadcasts "RIP Entry Request" through the network 4. When receiving this "RIP Entry Request," the RIP server 3-j sends out "RIP Entry Table" as shown in FIG. 9 with its own address given as a source address to the host computer 1-1. Because "RIP Entry Request" is transmitted in a broadcast form, this "Reply RIP Entry" is sent from the plurality of RIP servers 3-j.

When receiving "Reply RIP Entry," the host computer 1-1 picks up from the plurality of RIP servers the RIP server 3-j with its address designated as the source address to communicate with.

The host computer 1-1 shows the RIP entry table at its display section, allowing its user to select a desired entry (a printer to print out). When the printer is selected, the host computer 1-1 sends "Connection Request" to the RIP server 3-1 selected as the destination of its communications.

The RIP service daemon at the RIP server 3-1 starts the RIP processing program upon its reception of "Connection Request."

After outputting "Connection Request," the host computer 1-1 outputs PDL data to the RIP server 3-1.

The RIP processing program started at the RIP server 3-1 analyzes the PDL data received from the host computer 1-1 and produces raster image data, and it transfers the raster image data thus produced to the output engine 2-1A designated by the host computer 1-1 (RIP service daemon).

The output engine 2-1A receives the raster image data transmitted thereto through the network 4 and prints it out on such media as paper.

The above-described embodiment of the present invention is so configured that the host computer 1-1 prints out through the output engine 2-1A installed in the same room 5-1. However, it is possible to execute printing-out on a printer installed in a different room. As shown in FIG. 2, for example, the system can be so arranged that the host computer 1-1 installed in the room 5-2 sends out PDL data to the RIP server 3-1 to produce raster image data, which is then fed to the output engine 2-3A installed in the room 5-3 to print it out.

Incidentally, this invention can be applied where a network printer is equipped with a RIP. In other words, the network printer 2-1 shown in FIG. 2 is equipped with not only the output engine 2-1A but also a RIP section not shown in the drawing. When the host computer 1-1 executes printing-out by the means of the RIP section provided at the network printer 2-1 in this case, it needs not to use the RIP server 3-1. If the RIP section of the network printer 2-1 is relatively limited in its compatibility to handle, for example, LIPS (LBP Image Processing System) (Trademark) and ESC/P (Escape-P), the point sizes of fonts available for its printing-out are limited. The inclination of fonts is also limited in angles only with 90 degrees, 180 degrees and 270 degrees available. Fonts in the point sizes the RIP section is not equipped with cannot be usually printed out with an inclination with its angle not supported by the RIP section.

Against this, the font information section 24 of the RIP server 3-1 which supports PostScript (Trademark) as a RIP with higher performance allows fonts in any size desired to be selected with their inclination set as desired.

In view of the above, the host computer 1-1 sends out PDL data to the RIP server 3-1 through the network 4 to convert it into raster image data with fonts in a desired size inclined at a desired angle. This raster image data is fed to the network printer 2-1 through the network. The network printer 2-1 prints out the raster image data as it has been received, without using its RIP section. Therefore, the output engine 2-1A can print out the data. As a result, it becomes possible for the network printer 2-1 to carry out printing-out which it cannot execute as it is.

As in the above-described embodiment of the present invention, the network printer 2-k basically needs not to have a RIP section only with the RIP server 3-j provided with a RIP which is high in performance but expensive in cost. Therefore, a system with the large number of network printers sharing the limited number of RIP servers 3-j can be made low in cost.

What is claimed is:

1. A printing system comprising:

a command device to command printing-out;

a converting device to convert page description language data transmitted thereto through a network into raster image data; and a printing device to print out said raster image data transmitted thereto through the network;

said command device, said converting device, and said printing device being interconnected through said network;

wherein said command device sends said page description language data representing print-out data and a designation code to designate said printing device for executing printing-out, to said converting device through the network;

said converting device converts said page description language data transmitted thereto from said command device through the network into said raster image data, and outputs said raster image data together with a print-out command to said printing device designated by said command device;

said printing device, in response to said command, prints out said raster image data transmitted thereto from said converting device through the network;

said converting device stores in memory the network addresses of a plurality of printing devices connected to the network and, in response to a request from said command device for printing-out, supplies designation codes designating said printing devices to said command device through the network, wherein said designation codes comprise at least a network address and a printer characteristic and are stored in a data structure on said command device; and said command device, using said designation codes supplied from said converting device through the network, designates said printing device to execute printing-out.

2. A printing system according to claim 1, wherein said converting device stores in memory the characteristics of said printing devices and converts said page description language data into said raster image data matching the characteristics of said printing device to execute printing-out.

3. A printing system according to claim 1, wherein said command device outputs said print-out request to the network to be transmitted to one of said converting devices as desired.

4. A printing system according to claim 1, wherein said converting device compresses said raster image data and transmits the compressed raster image data to said printing device through the network; and said printing device decompresses said compressed raster image data transmitted thereto through the network.

5. A converting device, interconnected through a network with both a command device to command printing-out and printing devices to print out raster image data transmitted thereto through the network, for converting page description language data transmitted thereto from said command device through the network into raster image data, said converting device comprising:

a receiving means to receive a print-out command from said command device through the network;

a memory means to store a plurality of designation codes of a plurality of said printing devices connected on the network, wherein said designation codes comprise at least a network address and a printer characteristic;

a notifying means to, in response to a print-out request from said command device, notify said printing devices with their addresses stored in said memory means to said command device through the network;

a converting means to, when receiving page description language data representing print-out data transmitted thereto from said command device through the network, convert said page description language data into raster image data; and an output means to, when receiving from said command device the designation of said printing device to execute printing-out, output said raster image data to said address of said designated printing device through the network.

6. A converting device according to claim 5, further comprising a data compression means to compress said raster image data.

7. A converting device according to claim 5, wherein said memory means stores the characteristics of said printing devices; and said converting means converts said page description language data into raster image data matching the characteristics of said printing device to execute printing-out.

8. A data processing method for a converting device which is interconnected through a network with both a command device to command printing-out and printing devices to print out raster image data transmitted thereto through the network for converting page description language data transmitted thereto from said command device through the network into raster image data, said method comprising the steps of:

receiving a print-out command from said command device through the network;

previously storing, in a data structure on said command device, designation codes of a plurality of said printing devices connected on the network, wherein said designation codes comprise at least a network address and a printer characteristic;

notifying, in response to a print-out request from said command device, said printing devices with their addresses stored in said memory means to said command device through the network;

converting, when receiving page description language data representing print-out data transmitted thereto from said command device through the network, said page description language data into raster image data; and outputting, when receiving from said command device the designation of said printing device to execute printing-out, said raster image data to said address of said designated printing device through the network.

9. A printing system, comprising:

at least one command device configured to generate first data having a non-raster format;

one or more converting devices configured to receive said first data and in accordance therewith to generate second data having a raster format; and a plurality of printing devices configured to receive said second data and in accordance therewith to generate a print-out corresponding to said second data, wherein said at least one command device, said one or more converting devices, and said plurality of printing devices are configured to communicate information including said first data and said second data via a network;

said at least one command device is further configured to select a designation code indicative of a designated printing device of said plurality of printing devices and to communicate said designation code to a corresponding converting device of said one or more converting devices via said network;

said corresponding converting device is further configured to receive said designation code and in accordance therewith to communicate said second data to said designated printing device;

a quantity of said one or more converting devices is less than a quantity of said plurality of printing devices;

said at least one command device is further configured to generate a designation code request;

said one or more converting devices are each further configured to store printing device information including an associated subset of said plurality of printing devices and associated designation codes;

said one or more converting devices are each still further configured to receive said designation code request, and in accordance therewith to transmit said printing device information via said network to said at least one command device; and said at least one command device is further configured to receive said printing device information and in accordance therewith to select said designation code from said associated designation codes, wherein said associated designation codes comprise at least a network address and a printer characteristic and are stored in a data structure on said command device.

10. The printing system of claim 9, wherein:

said one or more converting devices include a memory having stored therein characteristic information of an associated subset of said plurality of printing devices, said associated subset of said plurality of printing devices including said designated printing device; and said one or more converting devices are further configured to generate said second data in accordance with said characteristic information corresponding to said designated printing device.

11. The printing system of claim 9, wherein:

said one or more converting devices are further configured to compress said second data as compressed second data and to communicate said compressed second data to said designated printing device; and said plurality of printing devices are further configured to receive said compressed second data and in accordance therewith to uncompress said compressed second data as said second data.

12. A printing method, comprising the steps of:

generating first data having a non-raster format and transmitting said first data via a network;

generating a designation code indicative of a designated printing device and transmitting said designation code via said network, wherein said designation code comprises at least a network address and a printer characteristic;

receiving said first data and in accordance therewith converting said first data into second data having a raster format;

receiving said designation code and in accordance therewith transmitting said second data via said network to said designated printing device;

receiving said second data and in accordance therewith generating a print-out corresponding to said second data;

storing printing device information including information indicative of a plurality of printing devices and associated designation codes, wherein said plurality of printing devices includes said designated printing device;

generating a designation code request and transmitting said designation code request via said network;

receiving said designation code request, and in accordance therewith transmitting said printing device information via said network; and receiving said printing device information and in accordance therewith selecting said designation code from said associated designation codes.

13. The printing method of claim 12, further comprising the steps of:

storing characteristic information of a plurality of printing devices including said designated printing device; and generating said second data in accordance with said characteristic information corresponding to said designated printing device.

14. The printing method of claim 12, wherein:

said step of receiving said designation code comprises compressing said second data as compressed second data, receiving said designation code, and in accordance therewith transmitting said compressed second data via said network to said designated printing device; and said step of receiving said second data comprises receiving said compressed second data, uncompressing said compressed second data as said second data, and in accordance therewith generating a print-out corresponding to said second data.

15. A computer program embodied on a computer-readable medium for converting non-raster data into raster data, comprising:

an input source code segment configured to receive from a network a designation code indicative of a designated printing device, and to receive from said network first data having a non-raster format;

a conversion source code segment configured to convert said first data into second data having a raster format;

an output source code segment configured to transmit said second data over said network to said designated printing device;

a storage source code segment configured to store printing device information including information indicative of a plurality of printing devices and associated designation codes, wherein said plurality of printing devices includes said designated printing device and said associated designation codes includes said designation code, wherein said associated designation codes comprise at least a network address and a printer characteristic; and a designation request source code segment configured to receive a designation code request and in accordance therewith to transmit said printing device information via said network.

16. The computer program of claim 13, wherein the storage source code segment is configured to store characteristic information of the plurality of printing devices including said designated printing device, wherein said conversion source code segment is further configured to convert said first data into said second data in accordance with said characteristic information corresponding to said designated printing device.

17. The computer program of claim 15, further comprising:

a compression source code segment configured to compress said second data as compressed second data, wherein said output source code segment is further configured to transmit said compressed second data over said network to said designated printing device.

18. A method of processing data in a converting device that is interconnected through a network with both a plurality of command devices to command printing-out and a plurality of printing devices to print out raster image data transmitted thereto through the network, comprising the steps of:

receiving a broadcast packet from a command device of said plurality of command devices;

in response to the received broadcast packet, sending to said command device a reply packet that includes information indicating said plurality of printing devices, wherein said information comprises at least a network address and a printer characteristic;

storing said information as designation codes in a data structure on a one of said plurality of command devices;

receiving a connection request packet from said command device that includes information indicating a selected one of said plurality of printing devices;

receiving a non-raster data packet that includes non-raster data; converting said non-raster data into raster data in accordance with characteristics of the selected printing device; and sending to the selected printing device a raster data packet that includes said raster data.

19. The method of claim 18, further comprising:

compressing said raster data before sending said raster data packet.

* * * * *